United States Patent

[11] 3,556,133

[72] Inventor Alan Launchbury
    Birmingham, England
[21] Appl. No. 743,208
[22] Filed July 8, 1968
[45] Patented Jan. 19, 1971
[73] Assignee Sperryn & Company Limited
    Birmingham, England
    a British Company

[54] CONTROL FOR GAS APPLIANCES
    1 Claim, 2 Drawing Figs.
[52] U.S. Cl............................................. 137/492.5
[51] Int. Cl............................................ F16k 31/145
[50] Field of Search................................. 137/487.5,
    485, 487, 492.5; 251/31, 57

[56] References Cited
    UNITED STATES PATENTS
1,302,538  5/1919  Gulick........................... 137/413
2,203,243  6/1940  Wettstein..................... 137/492.5X
3,051,432  8/1962  Sullivan........................ 251/57X Primary Examiner—M. Cary Nelson
Assistant Examiner—R. B. Rothman
Attorney—Scrivener, Parker, Scrivener and Clarke ABSTRACT: A valve head in a gas valve through which gas is supplied to a gas-fired appliance is actuated by a diaphragm exposed on one side to liquid pressure generated by a centrifugal pump driven by an electric motor.

PATENTED JAN 19 1971 3,556,133

CONTROL FOR GAS APPLIANCES

This invention relates to new or improved control means for controlling the supply of gas to gas-fired appliances.

According to our invention a valve through which gas is supplied to a gas-fired appliance is actuated by a diaphragm exposed on one side to liquid pressure generated by a centrifugal pump driven by an electric motor.

The valve head is conveniently urged by a spring into engagement with a seat between a gas inlet and an outlet leading to the appliance and is adapted to be moved away from the seat by the diaphragm exposed to the liquid pressure, and that pressure is controlled by means sensitive to the outlet pressure of the gas whereby the pressure of the gas supplied to the appliance is maintained substantially constant.

The pressure of the liquid may also be controlled by thermostatic means sensitive to the temperature in the appliance to maintain that temperature within predetermined limits.

The arrangement provides a very smooth and accurate control of the rate of opening of the valve and of the rate at which gas is supplied to the appliance.

Our improved valve is particularly suitable for use with natural gas and other gases containing a high proportion of methane.

A practical form of valve limit in accordance with our invention is illustrated in the accompanying drawings in which.

Figure 2:
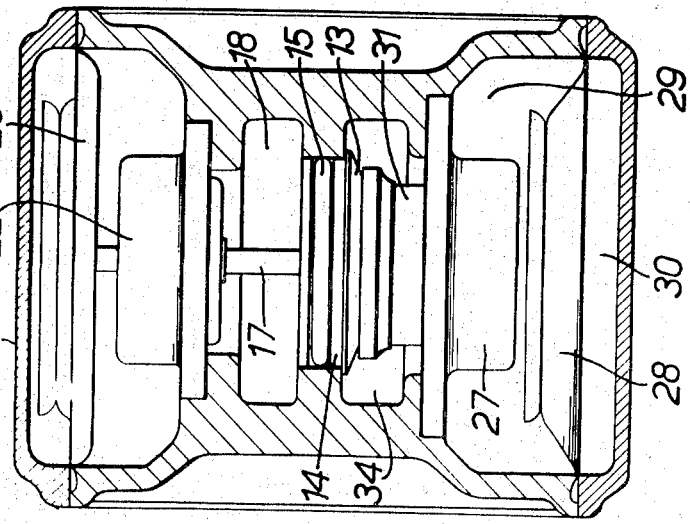
FIG. 2 is a transverse section on the line 2-2 of FIG. 1.
Figure 1:
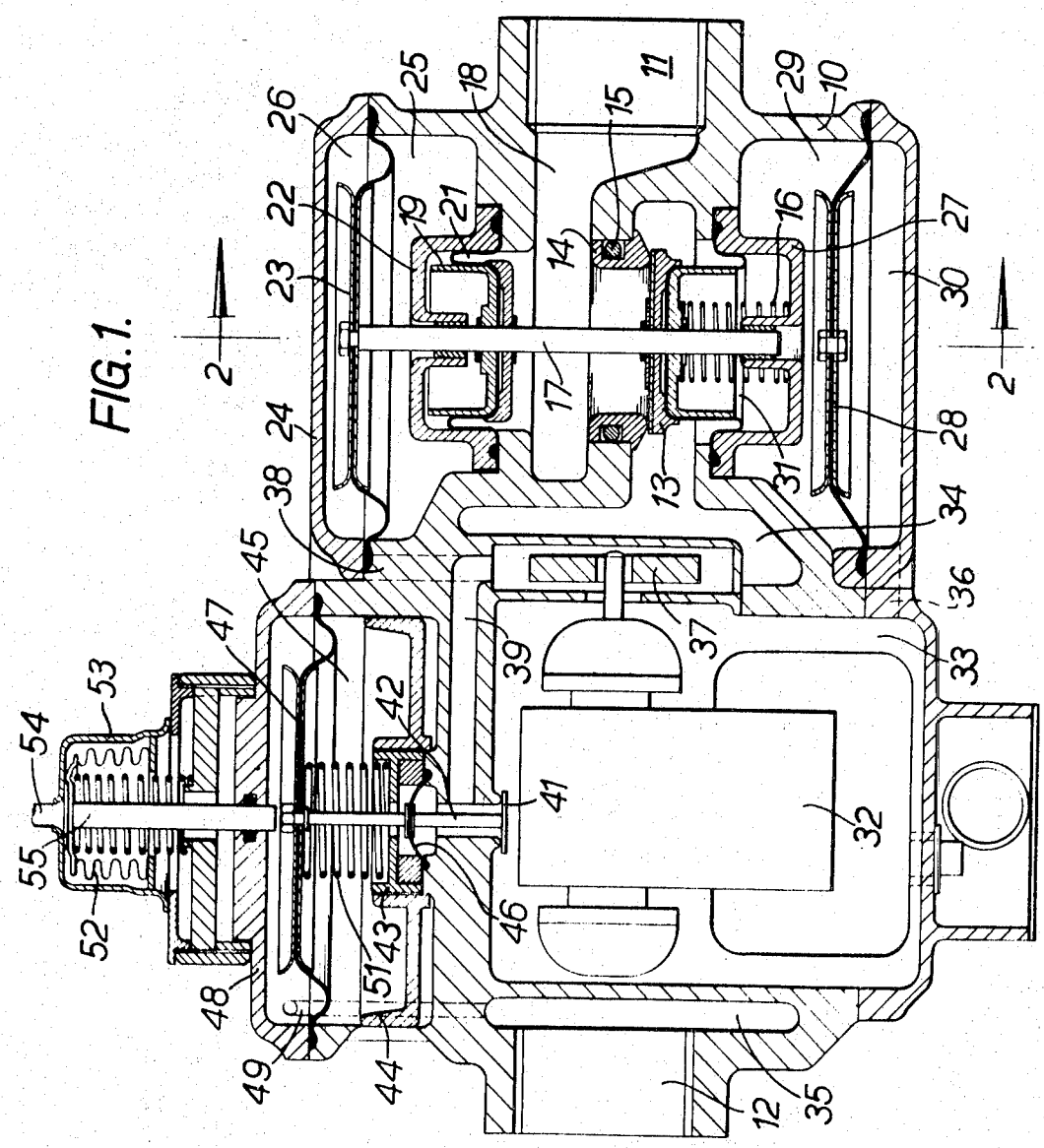
FIG. 1 is a vertical section of the unit.

In the unit illustrated the valve and the pump by which it is actuated and controlled are mounted in a common housing 10.

Gas enters the unit through an inlet 11 at one end and leaves by an outlet 12 at the opposite end.

The flow of gas is controlled by valve head 13 cooperating with a seat 14 which may be integral with the housing, but preferably it is a separate insert sealed by an 0 ring 15. The valve head which is urged upwardly into engagement with the seat by a light spring 16 is mounted on a stem 17 which extends upwardly through a passage 18 leading from the inlet to the valve seat, and above that passage the stem is carried through and secured in a cup 19 working in and connected by a rolling diaphragm 21 to a cap 22 mounted in the housing.

The cup 19 is of the same area as the valve seat and as it is exposed to the inlet pressure it balances the effect of that pressure on the valve head. The upper end of the stem after passing through a bearing in the cap 22 is secured in a diaphragm 23 which is clamped around its periphery by a cover 24 and separates a lower chamber 25 open to atmosphere from an upper chamber 26 to which liquid under pressure is supplied by the pump as described below.

The lower end of the valve stem is guided in a bearing in an inverted cap 27 depending into a chamber divided by a diaphragm 28 into an upper chamber 29 open to atmosphere and a closed lower chamber 30 forming a recuperation chamber for the pumped liquid. The diaphragm takes care of any fluctuations in the volume of the liquid. The space within the cap 27 is sealed by a rolling diaphragm 31 attached to the underside of the valve.

The pump motor 32 which is a wholly enclosed shaded pole motor is located in a chamber 33 around which gas after passing through the valve flows to the outlet by way of passages 34 and 35. The chamber 33 is wholly filled with the operating liquid which is preferably a silicone fluid having high stability, constant viscosity, and compatibility with the materials in the unit with which it comes into contact.

At its lower end the chamber 33 is in communication by way of a passage 36 with the chamber 30. The motor drives an impeller 37 located in a lateral extension of the chamber 33 and this extension is in communication by way of a passage 38 with the chamber 26 above the diaphragm 23, and also by way of a passage 39 with a plate valve 41 controlling the return of liquid to the chamber 33. This valve, which cooperates with a seat leading into the upper end of the chamber 33, is carried on the lower end of a stem 42 passing upwardly through an opening in a ring 43 adjustably screwed into a cup 44 mounted in the lower end of a chamber 45, the stem being sealed by a diaphragm 46. The upper end of the stem is secured in a diaphragm 47 closing the upper end of the chamber 45 and clamped around its periphery by a cover 48. The space below the diaphragm is open to atmosphere but the space within the cover above the diaphragm is in communication by way of a passage 49 with the gas outlet.

The outlet gas pressure acts downwardly on the diaphragm 47 in opposition to the upward force exerted by a spring 51 located between the diaphragm and the ring 43 by which the spring loading can be adjusted.

Mounted on the cover 47 is a thermostatic control of known type in which a bellows 52 located within a casing 53 is exposed externally to the pressure of a liquid in a bulb which is sensitive to the temperature in a boiler or other appliance heated by gas supplied through the valve. The bulb is connected to the casing 53 by a pipe 54. The bellows is attached to a stem 55 in alignment with and adapted to act on the stem 42 of the valve 41.

To open the valve the motor is switched on and delivers liquid under pressure to the chamber 26 whereby the diaphragm 23 moves the valve stem 17 downwardly to move the valve head 13 away from its seat and allow gas to flow to the outlet and so to the appliance.

If the outlet pressure, that is the pressure of the gas supplied to the appliance, rises above a predetermined value it urges the diaphragm 47 downwardly against the action of the spring 51 and opens the plate valve 41 so that liquid from the extension can return to the chamber 33. This reduces the liquid pressure above the diaphragm 23 and allows the valve to close wholly or partially.

When the outlet pressure falls again the valve 41 closes and the pressure above the diaphragm 23 increases and the gas valve opens wholly or partially so that a substantially constant governed output gas pressure is automatically maintained.

Also when the temperature in the appliance to which the bulb of the thermostatic control is exposed reaches a predetermined value the bellows 52 opens the plate valve 41 with the same effect, the flow of gas being restored or increased as the temperature falls again and the bellows contracts.

In the known types of gas valve actuated by hydraulic pressure generated by a motor-driven pump the pump is usually a fixed displacement pump and the motor when switched on runs until the hydraulic pressure generated is sufficient to open the valve fully. The valve then trips a switch which deenergizes the motor and the valve is held open by liquid trapped between the pump and the diaphragm acting on the valve until another switch is operated to energize a solenoid which opens a relief valve allowing the trapped liquid to return to a reservoir.

In our improved valve we employ a continuously running motor driving a centrifugal pump producing a limited maximum pressure which can be modulated by the outlet gas pressure and by the temperature in the appliance supplied with gas through the valve.

If no gas is required on the outlet side the pump simply circulates the liquid without generating any pressure and the valve closes without the necessity for a solenoid-operated relief valve which is a frequent source of trouble.

I claim:

1. A gas valve through which gas is supplied to a gas-fired appliance and in which a valve head is urged by a spring into engagement with a seat between a gas inlet and an outlet leading to the appliance, wherein said valve head is attached in a diaphragm exposed on one side to liquid pressure generated by a centrifugal pump continuously driven by an electric motor and said motor is sealed and is located in a chamber to which liquid returns from the pump through a valve which is urged toward the closed position by a spring and is adapted to be moved away from the closed position by a diaphragm exposed to the outlet gas pressure in order to control the pressure of the liquid delivered by the pump, said valve and its actuating mechanism and said electric motor and pump being located in a common housing to form a unit having a gas inlet and an outlet between which the gas, after passing through the valve seat, flows through passages around said chamber containing the motor.